United States Patent

Besoyan

[15] 3,638,766
[45] Feb. 1, 1972

[54] MANUAL CONTROL FOR AUXILIARY BRAKE DEVICE

[72] Inventor: Kirk Besoyan, Blythe, Calif.
[73] Assignee: Safety Vee Brake, Inc., Blythe, Calif.
[22] Filed: July 10, 1970
[21] Appl. No.: 53,795

[52] U.S. Cl. ............................................188/106 P, 188/162
[51] Int. Cl. ..............................................F16d 65/34
[58] Field of Search...................188/77 R, 106 R, 106 P, 162

[56] References Cited

UNITED STATES PATENTS

| | | | |
|---|---|---|---|
| 2,734,590 | 2/1956 | Hays | 188/162 X |
| 2,825,428 | 3/1958 | Stiebinger | 188/162 |
| 2,933,159 | 4/1960 | Stiebinger | 188/106 P |
| 3,516,519 | 6/1970 | Besoyan | 188/162 X |

*Primary Examiner*—Duane A. Reger
*Attorney*—Watson, Cole, Grindle & Watson

[57] ABSTRACT

An auxiliary brake device comprising a continuous flexible cable extending about a pair of sheaves secured to opposite ends of a vehicle axle, friction elements carried by the cable and engaging the sheave walls for braking the vehicle as the cable is drawn tight, a manual control means for optionally operating an automatic control to actuate the cable for applying the brake in the event of automatic control failure.

8 Claims, 6 Drawing Figures

INVENTOR,
KIRK BESOYAN

BY Watson, Cole, Grindle & Watson
ATTORNEYS

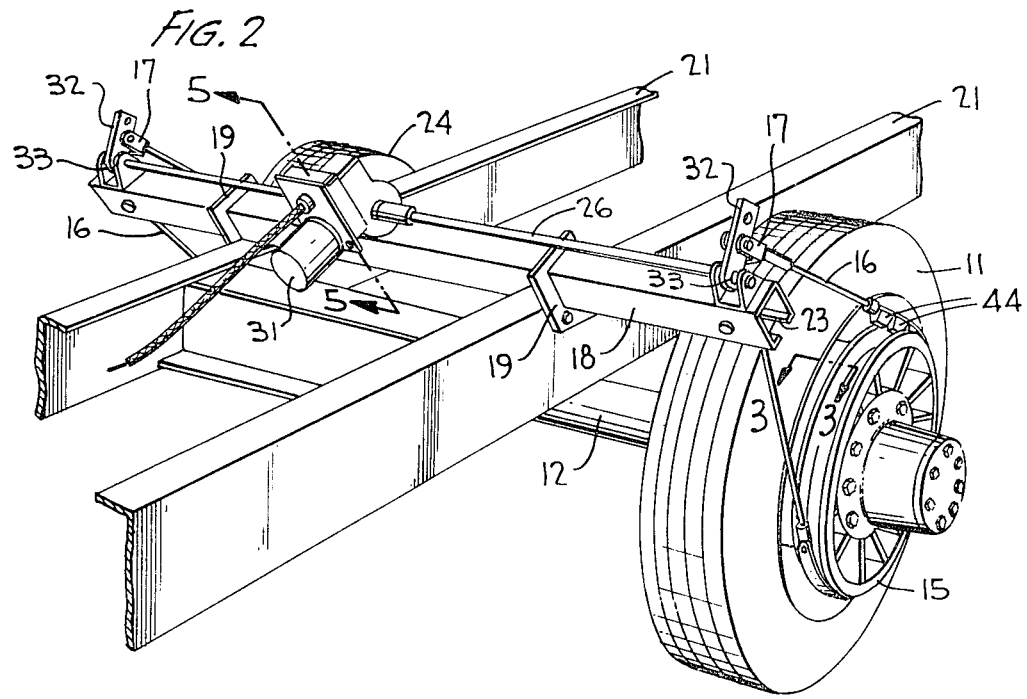
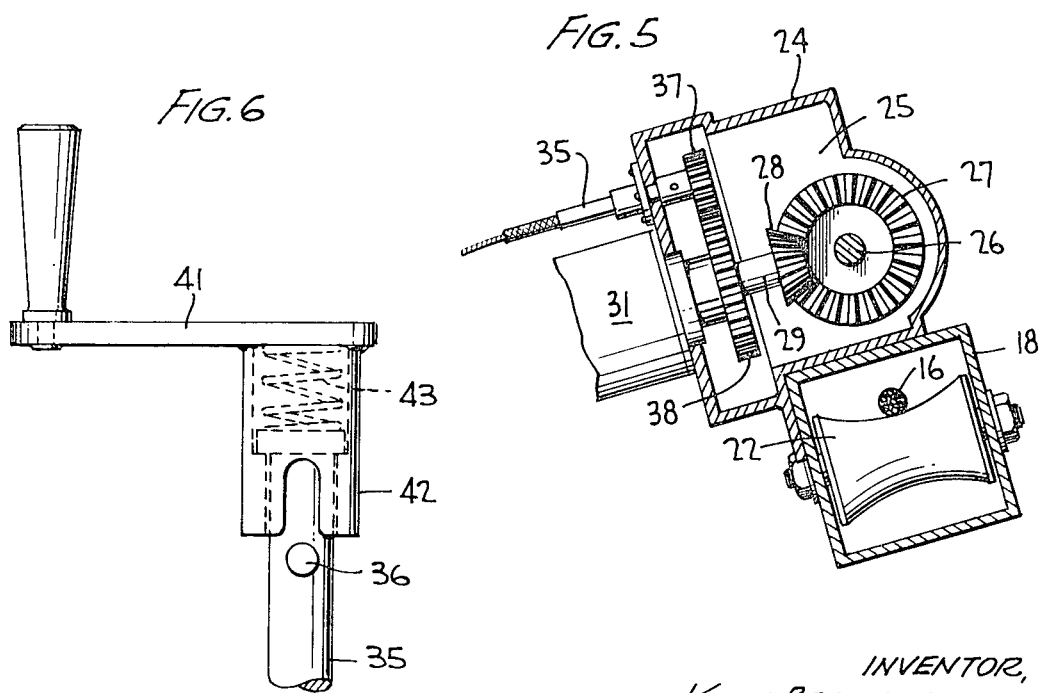

MANUAL CONTROL FOR AUXILIARY BRAKE DEVICE

This invention relates generally to a vehicle braking device and, more particularly, to a means for manually applying the brake of an auxiliary braking system which is otherwise provided with an automatically operable brake control.

In U.S. Pat. No. 3,516,519, issued June 23, 1970 for an Auxiliary Brake and Braking System and commonly owned by assignee herein, a brake mechanism or system is disclosed as one which is operable independently of a vehicle's ordinary service brakes and which is applicable for trucks and other vehicles as an auxiliary piece of braking equipment. Such a brake is disclosed as comprising a flexible cable which extends around a sheave mounted at either end of the vehicle axle thereby acting as an auxiliary brake drum so that braking elements, which are carried by the flexible cable, may be made to frictionally engage with the walls of the sheave groove when the cable is drawn tight. The flexible cable is shown therein to extend about a pair of sheaves as a single cable so that each end thereof may be automatically moved toward and away from the vehicle axle by means of a reversible motor operatively connected thereto. Upon actuation of each electric motor, each end of the flexible cable is thereby moved with relation to the vehicle axle so as to move the cable either toward or away from the sheave groove thereby respectively engaging and disengaging the friction elements with the sidewalls of the sheave groove. Although such a braking mechanism as described therein is highly effective in stopping moving vehicles for which it is intended, certain areas of improvement have become desirable. For example, if one of the two electric motors becomes inoperable, the remaining operating motor would not only be placed under considerable strain during the braking of only one wheel, but the friction elements and the cable associated with only one wheel would be possibly not wholly effective in bringing the vehicle to a stop. Most importantly, in the event of a total electrical power failure of the motor vehicle, neither electric motor could obviously function to apply the auxiliary brake. Means have been accordingly devised for anticipating these potential difficulties and are made the subject of the present invention.

It is, therefore, the principle object of this invention to provide a means for effectively braking a motor vehicle even in the event of an electric power failure in the vehicle.

Another object of the present invention is to provide a control means which will manually operate the auxiliary brake in the event that the automatic brake control ceases to function.

A further object of this invention is to provide an auxiliary braking device in which a plurality of friction elements are carried by a flexible cable extending about a sheave at each end of the vehicle axle which forms a brakedrum with which the friction elements make frictional engagement when the cable is tightened, the means for tightening the cable being a reversible electric motor operatively associated with both ends of the cable through a meshing gear arrangement, and means for manually moving each cable and through the gear arrangement in the event of failure by the motor.

A still further object of the present invention is to provide an auxiliary braking device as characterized wherein the gear arrangement includes an elongated lever rod mounted at each end to one end of the cable so that upon rotation by either the motor or the manual control the rod will effectively tighten the cable about each sheave and brake the vehicle axle.

A still further object of this invention is to provide such an auxiliary braking device wherein the manual cable-moving means is a rotary shaft in constant engagement at one end with the electric motor gear and having provided at its other end a crank lever arm operatively engageable for turning same.

Other objects, advantages and novel features of the invention will become apparent from the following detailed description of the invention when considered in conjunction with the accompanying drawings, wherein:

FIG. 2 is a partial perspective showing one of a pair of rear dual wheels in relation to the auxiliary braking device of the present invention;

FIG. 5 is a sectional view taken along the line 5—5 of FIG. 2 showing the meshing gear arrangement of the brake device control; and FIG. 6 is a view showing a crank arm mounted at an end of the manual control shaft for rotating same.

Figure 1:
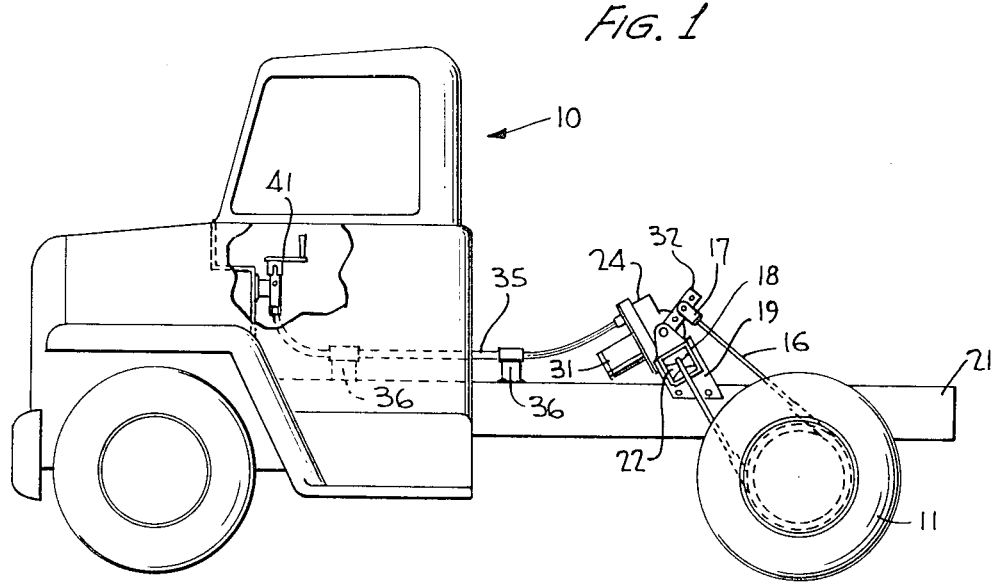
FIG. 1 is a side view of a motor vehicle incorporating the improved auxiliary braking device in accordance with the present invention.
Figure 4:
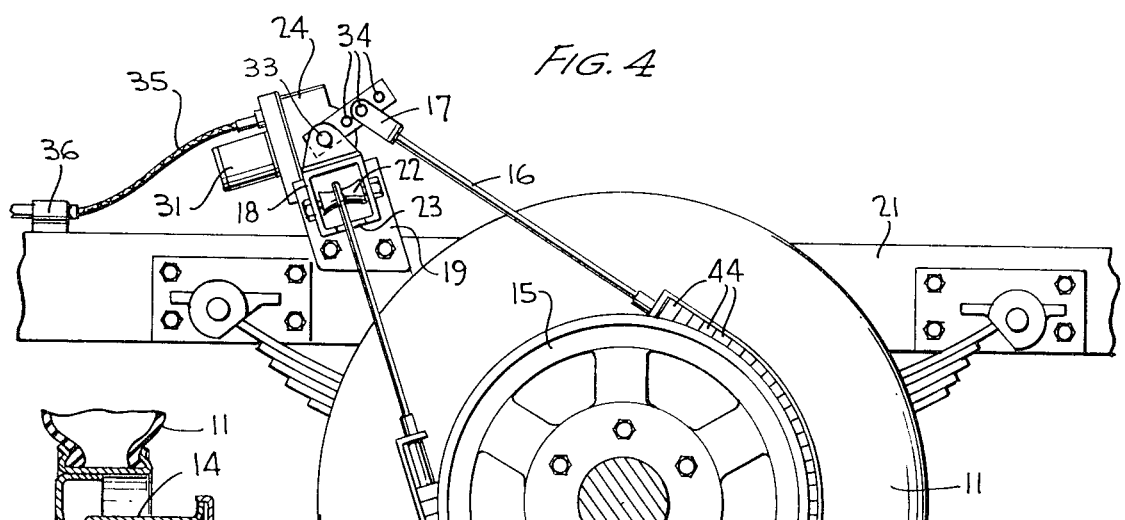
FIG. 4 is a side view in elevation of the vehicle's rear wheel in relation to the auxiliary braking device of the present invention.
Figure 3:
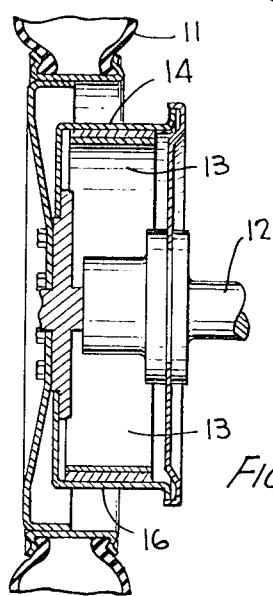
FIG. 3 is a sectional view taken along the line 3—3 of FIG. 2 showing a conventional brakedrum and brakeshoe arrangement for the vehicle.

Turning now to the drawings wherein like reference characters refer to like and corresponding parts throughout the several views, there is shown in FIG. 1, a motor vehicle 10 equipped with the auxiliary braking device in accordance with the present invention which is shown more clearly in FIG. 2 in its relation with the rear wheels of the vehicle. For the sake of clarity, only one of such wheels is shown at 11, there being normally a pair of dual wheels mounted at opposite ends of a vehicle axle 12. The vehicle is equipped with a service brake in the form of a conventional brakedrum 14 at each axle end cooperable with conventional brakeshoes 13 as shown in FIG. 3. A sheave 15 similar to the one described in the above-mentioned patent is mounted at each end of axle 12 onto the outer periphery of each brakedrum 14. A flexible cable 16 extends about at least 180° of the sheave circumference at each axle end so that each end 17 of the cable is located in a manner shown in FIG. 2, while the portion of the cable lying between sheaves extends through an elongated tubular element 18 located transversely across vehicle frame members 21 and conveniently mounted thereto by means of brackets 19. As shown more clearly in FIGS. 4 and 5, the cable rests against a convex friction roller 22 mounted within each end of tubular element 18 so that, upon movement of the cable ends 17, the portion of the cable extending through the tubular element will simply roll along the rollers. Tubular element 18 is slightly notched as at 23 (See FIG. 2) to accommodate entry of the cable at opposite ends of the tubular element.

A housing 24 for a meshing gear arrangement 25 is secured to element 18 at approximately its centerline. The gear arrangement is provided for rotating an elongated lever rod 26 having a bevel gear 27 secured thereto in meshing engagement with a bevel gear pinion 28 mounted on a shaft 29 rotatable by means of a reversible electric motor 31. Opposite ends of elongated rod 26 are provided with a lever arm 32 secured at one end as at 33 and having apertures 34 spaced longitudinally to accommodate the cable end 17 in a preselected one thereof. Accordingly, upon energization of the electric motor 31, the elongated rod 26 is rotated through bevel gear and pinion 27, 28 so that lever arms 32 are pivoted about their ends 33 either toward or away from vehicle axle 12. Both ends 17 of the cable are moved so as to either tighten or loosen the cable about each sheave by means of the reversible electric motor 31 which serves as a single automatic control for the auxiliary brake device. As the cable is tightened about each sheave friction elements 44, mounted on cable 16 in a manner similar to that described in the previously mentioned patent brought into frictional engagement with the sidewalls defining the groove of the sheave to thereby apply a braking force to the vehicle axle.

In the event of either a faulty motor 31 or a complete electric power failure of the vehicle, the bevel gear and pinion 27, 28 and hence the motor operated auxiliary brake device are rendered inoperable. A means for manually controlling the auxiliary brake is therefore available with the present invention. Such a manual control is in the nature of a rotatable shaft 35 operatively associated at one end with the meshing gear arrangement 25 and extending therefrom to the interior of the vehicle cab, as shown in FIG. 1, in the vicinity of the driver's seat. The shaft 35 may be of any desired length to accommodate various sized motor vehicles and is conveniently secured to one of the frame members 21 by means of brackets 36. Between these brackets, for example, the shaft may be a straight rigid rod and, between each bracket and the opposite ends of the shaft, it may be of the flexible rotary type which is customarily designed as concentric, oppositely wound coil springs for transmitting rotary motion along a curved line. The one end of shaft 35 is provided with an external spur gear pinion 37 in meshing engagement with an external spur gear 38 mounted on electric motor shaft 29. The other end of shaft 35 is provided with a pair of short lugs 36 (only one of which is shown in FIG. 6) for engagement with a portion of a handcrank 41 which is provided with a forked collar member 42 having a coil spring 43 resting against the free end of shaft 35 to thereby urge the handcrank away from such free end and out of engagement with lugs 36. In this way, rotation of motor shaft 29 by the electric motor 31 constantly rotates shaft 35 because of the spur gear and pinion 36, 37 arrangement. This constant rotation of the shaft does not, however, interfere with the driver in the vehicle cab since the handcrank 42 remains out of engagement with lugs 36 and the crank 41 therefore remains stationary. If the electric motor 31 fails or if an electrical power failure on the vehicle occurs, the manual control will be always available for controlling the auxiliary brake system when the need arises. The driver simply depresses the crank 41 until the forked collar portion 42 engages with lugs 36 on shaft 35 whereafter the crank arm may then be rotated for turning the spur gear and pinion 38, 37 which turns the bevel gear and pinion 27, 28 so as to rotate rod 26. Lever arms 32 are then pivoted away from the vehicle axle so as to tighten the cable about each sheave and thereby bring friction elements 44 into frictional engagement with the sidewalls of the sheave groove. Naturally, a turn of the crank arm 41 in the opposite direction will cause lever arms 32 to be pivoted toward the vehicle axle 12 and thereby loosen the cable about the sheave whereupon the friction elements will become disengaged from the sidewalls of the groove sheave.

From the foregoing it can be seen that a simple and inexpensive, yet highly effective means for manually controlling an auxiliary brake system has been devised which is readily adaptable for use with the brake system disclosed in the parent application. The driver simply turns a crank which is conveniently located in the cab of the vehicle, and by his own muscle power in actuating the manual control system, may bring the vehicle to a complete stop if either the vehicle service brakes, the reversible electric motor or the entire electrical power system fails to operate. A runaway situation of the motor vehicle can therefore always be avoided, first by application of the automatically controlled auxiliary brake device and if this fails by application of the manual control system. The shaft 35 is always in direct operative engagement with motor shaft 29 so that, when necessary, the motor shaft may be rotated for tightening the cable 16.

Obviously, many modifications and variations of the present invention are possible in the light of the above teachings. It is, therefore, to be understood that within the scope of the appended claims, the invention may be practiced otherwise than as specifically described.

What is claimed is:

1. An auxiliary braking device for a vehicle having a frame, an axle carried by said frame, a wheel at opposite ends of said axle, comprising, in combination, a sheave secured relative to and concentric with each wheel for rotation therewith, a flexible cable extending about said sheaves over at least 180° of each sheave circumference, said cable being movable toward and away from the bottom of the sheave groove, a plurality of friction elements carried solely by said cable into and out of frictional engagement with the sidewalls defining the groove of said sheave, and means for moving said cable to draw the friction elements into and out of frictional engagement with said sheave groove sidewalls, said cable-moving means comprising a reversible electric motor operatively associated with each end of said cable through a meshing gear arrangement for moving each cable end toward and away from said vehicle axle and thereby moving said cable, and means for manually moving each cable end through said meshing gear arrangement in the event of failure by said motor.

2. The auxiliary braking device according to claim 1, wherein said meshing gear arrangement comprises a plurality of intermeshing gears operatively associated with both said motor and an elongated lever rod for rotating said rod which is interconnected at each end thereof with a respective cable end whereby, upon rotation of said rod, said cable ends are moved toward and away from said axle.

3. The auxiliary braking device according to claim 2, wherein said manual cable moving means comprises a rotary shaft in meshing engagement at one end with one of said gears operatively associated with said motor, said shaft being rotatable during movement of said cable ends by means of said motor.

4. The auxiliary braking device according to claim 3, wherein the other end of said shaft is provided with the crank arm operatively engageable with said shaft.

5. The auxiliary braking device according to claim 4, wherein each said end of said elongated lever rod is provided with a lever arm secured at one end thereto, each lever arm having longitudinally spaced apertures and said cable ends being connected to the respective lever arms through a selected one of said apertures whereby, rotation of said shaft moves each said arm about said secured end to thereby move each said cable end toward and away from said vehicle axle.

6. The auxiliary braking device according to claim 4, wherein said shaft is of the flexible type along at least a portion of its length.

7. The auxiliary braking device according to claim 1, wherein said vehicle has a conventional brakedrum and conventional brakeshoes associated with each of said wheels for braking said vehicle independently of the auxiliary braking device, each said sheave being secured to the outer periphery of each said drums.

8. The braking device according to claim 6, wherein said vehicle has a conventional brakedrum associated with each of said wheels, each said sheave being secured to the outer periphery of each said drums.

* * * * *